B. T. BROWAND.
METAL WORKING MACHINE.
APPLICATION FILED JUNE 7, 1912.
1,148,007.
Patented July 27, 1915.
2 SHEETS—SHEET 1.
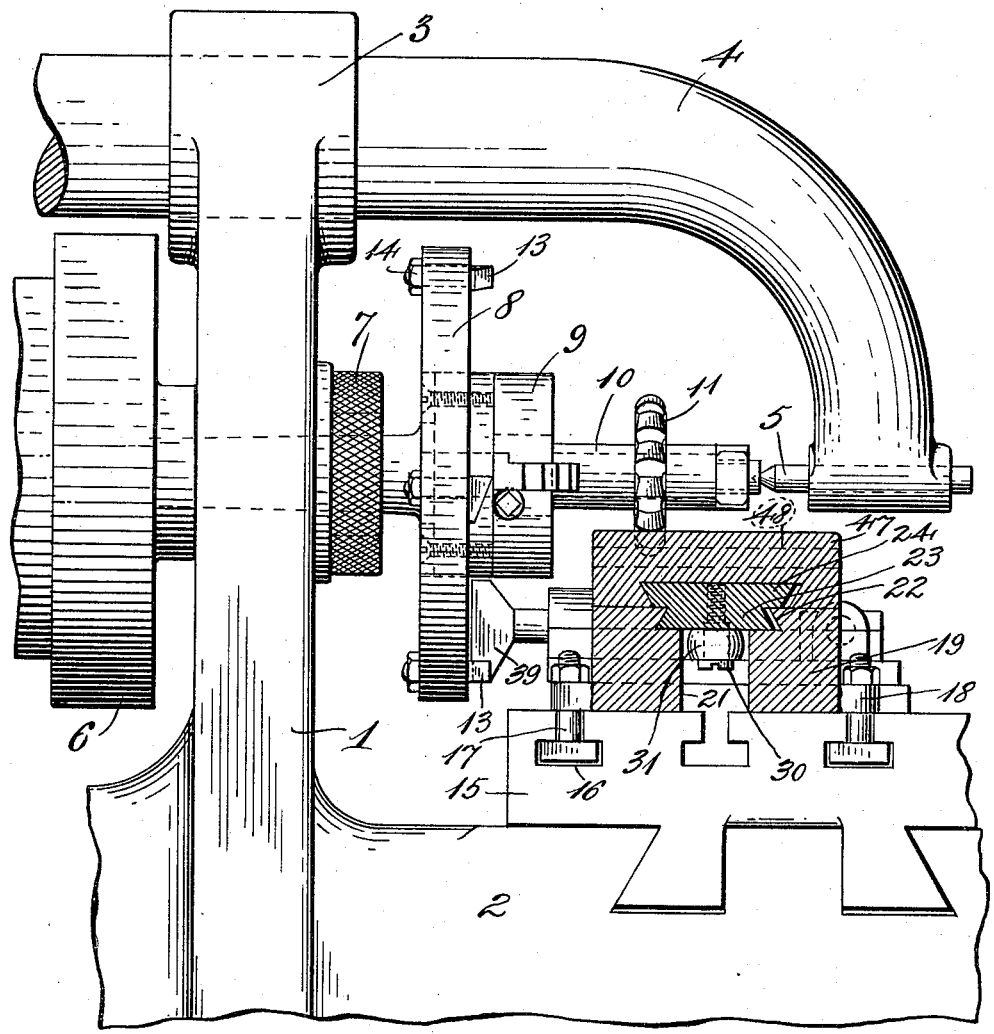
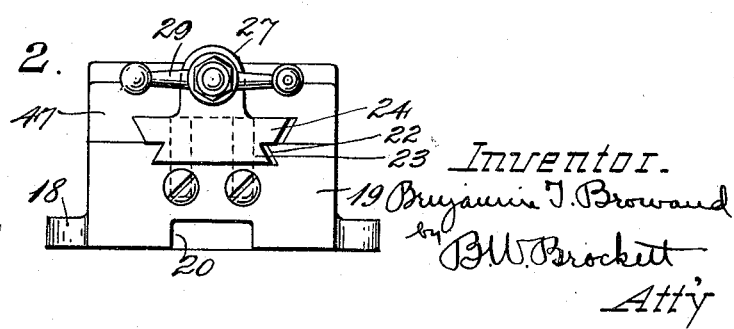

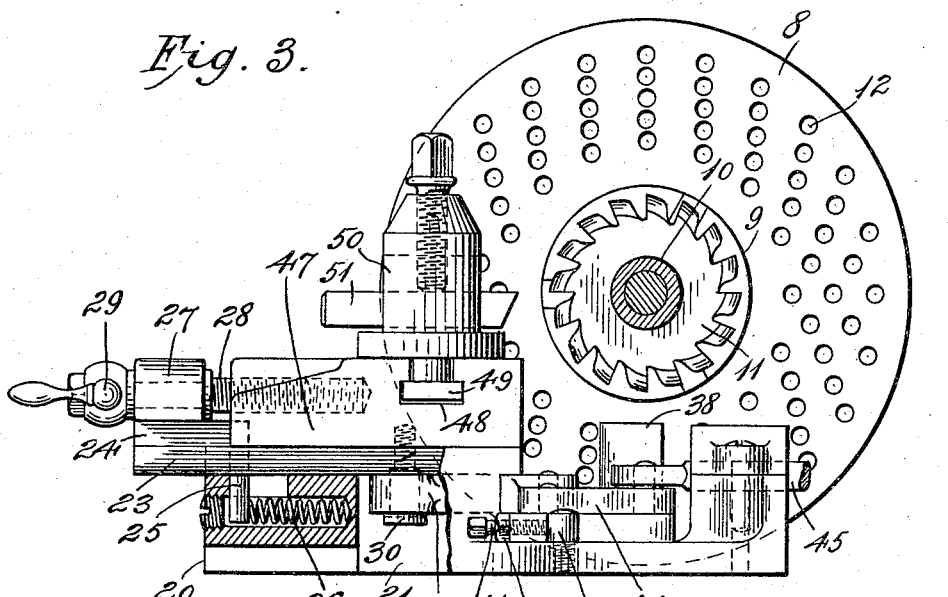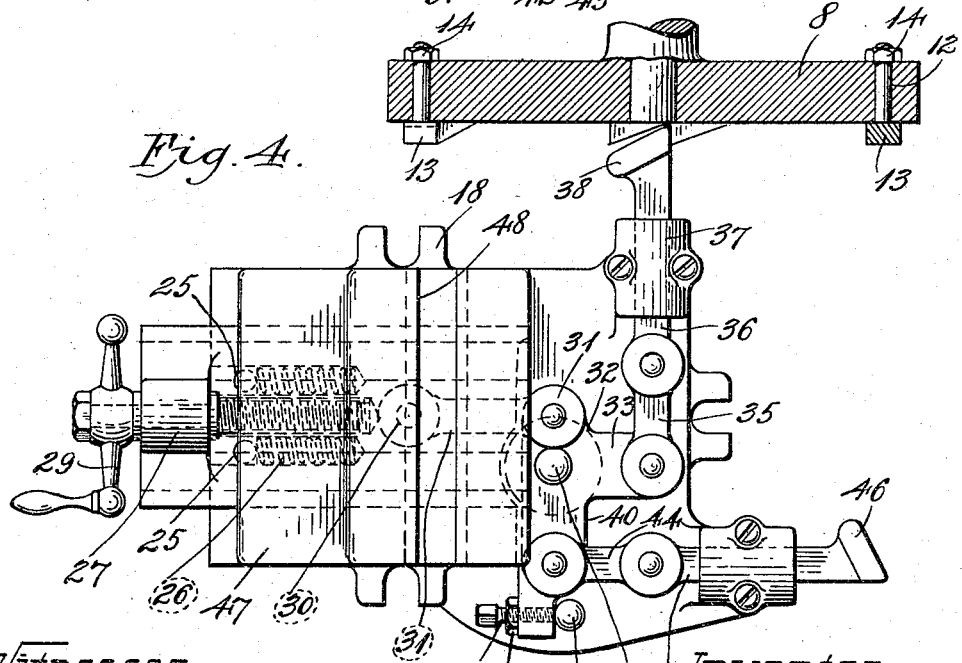

UNITED STATES PATENT OFFICE.

BENJAMIN T. BROWAND, OF CLEVELAND, OHIO.

METAL-WORKING MACHINE.

1,148,007.

Specification of Letters Patent.

Patented July 27, 1915.

Application filed June 7, 1912. Serial No. 702,224.

*To all whom it may concern:*

Be it known that I, BENJAMIN T. BROWAND, a citizen of the United States, residing at Cleveland, in the county of Cuyahoga and State of Ohio, have invented certain new and useful Improvements in Metal-Working Machines, of which the following is a specification.

This invention relates to improvements in metal working machines generally, and particularly to that class of such devices employed in the manufacture of milling cutters, and is designed for the purpose of manipulating the tool to undercut or back off, as it is called, the teeth of the cutter and to perform this operation automatically.

More specifically the invention relates to an attachment to be applied to milling machines, lathes and like devices, and comprises a face plate driven by the live spindle which also drives the cutter blank, together with mechanism properly supported in a position to coöperate with cams mounted on the face plate and carrying a cutting tool adapted to engage the straight edge of the teeth of the blank and cut back the metal beyond the edge so as to form the cutter with overhanging or back off teeth.

The invention may be further briefly summarized as consisting in the combination and construction of parts hereinafter set forth in the following description, drawings and claims.

Referring to the drawings, Figure 1 is a side elevation of a portion of a milling machine provided with my device; Fig. 2 is a detail view; Fig. 3 shows the device in its relation with respect to the face plate and the cutter blank; and Fig. 4 is a top plan view of the same.

In carrying out the invention any preferred form and construction of milling machine or lathe may be supplied with my attachment provided they possess the necessary features, I have shown in the drawings, however, the device applied to a milling machine, and in this embodiment, 1 represents the frame of the machine which is provided with the usual knee or bed 2 and an upper bearing 3 supporting a bracket 4 provided with the usual center 5 for supporting the outer end of the arbor upon which the work is mounted. Rotatably mounted in the frame, and partially shown in the drawings, is a suitable cone pulley 6 which drives the live spindle member 7 in the usual manner. Secured to this live spindle is a suitable face plate 8 of ordinary construction except that it is provided, in the case of the present apparatus, with a plurality of rows of holes varying in number according to the number of teeth of the various cutters to be operated upon. Secured to this live spindle is a chuck 9 of any preferred construction but adapted to hold an arbor 10 which carries the blank 11 and is held at its outer end by the center 5. All the foregoing mechanism is of the usual construction, with the exception of the face plate 8, this plate being provided with a plurality of rows of holes, as before stated.

The plate 8 is provided with a plurality of rows of holes 12 varying in number according to the number of teeth of the various cutters to be backed off on this machine, it being quite obvious that the number of rows and the number of openings in each row may be varied as desired so as to back off cutters of any number of teeth. Secured rigidly in the holes of the proper row of openings 12 are a plurality of cams 13 held in place by suitable nuts 14. There is a cam for each tooth of the cutter blank 11. It is understood that the face plate 8, together with the cams 13 rotate with the cutter blank.

Slidably mounted upon the bed 2 is the usual transverse slide 15 having T-shaped slots 16 therein which receive suitable bolts 17 passing into notched lugs 18 integral with the base 19 of the cutting tool attachment. This base 19 is provided with a longitudinal opening 20 extending from the left end as shown in Fig. 3 for a short distance and there merging into an opening 21 extending up through the base into a longitudinal dove tail recess 22 in the upper face of the base. Slidably mounted in this dove tail recess 22 is a dove tail slide 23 having a portion engaging in the recess 22 and another portion 24 extending above the base. Secured in the underside of this dove tail slide are two pins 25 which extend into suitable openings in the base and engage coil springs 26 which thrust backward against the wall of the base and tend to thrust the dove tail slide to the left, as shown in Figs. 3 and 4. This dove tail slide 23 is still further provided with a bearing 27 supporting a hand screw 28 provided with a handle 29. The dove tail slide is still further provided with a screw 30, shown in Fig. 1, and in dotted lines in Fig. 3, secured in the block and extending into the opening 21 and there pivotally connected to a link 31 pivotally connected to an arm 32 of a lever 33 fulcrumed upon a pin 34 secured in the base.

The lever 33 is pivotally connected by a link 35 with a sliding bar 36 mounted in a suitable bearing 37 supported in the base and carrying at its outer end a shoe 38 provided with an inclined side face 39, shown in Fig. 1. This face 39 is of a suitable length vertically so that it can engage with cams mounted in any row of openings 12 in the face plate 8, as shown clearly in Fig. 1. The lever 33 is still further provided with an arm 40 extending out to a point beyond the main body portion of the base and there provided with an adjusting screw 41 held in place by a lock nut 42 adapted to engage a stop 43 secured in the base in the path of the screw. By means of this adjustment the normal position of the dove tail slide may be regulated or in other words, the throw of the mechanism may be regulated as will later be brought out. Pivotally secured to the arm 40 is another link 44 pivoted to a sliding bar 45 similar in all respects to the sliding bar 36 and having at its outer end a suitable shoe 46. This shoe 46 and the connecting mechanism is utilized by turning the device so that the shoe will engage the cams on the face plate, in which case, the teeth of an end cutter blank may be backed off in the same manner in which the peripheral teeth are backed off, as are shown in this case. Slidably mounted on the upper portion 24 of the dove tail slide is a tool slide 47 having on its upper face a transverse dove tail slot 48 which receives the bolt end 49 of the usual tool post 50 in which the tool 51 is mounted.

In operation the machine is set up with the arbor and the cutter blank in place and with the cams regularly spaced and corresponding in number to the number of teeth in the cutter blank. After this has been accomplished, the operator then adjusts the tool so that it will engage the teeth at the proper point and then adjusts the screw 41 to give the proper movement of the tool on the teeth, that is, to adjust the lever 33 when it is operated by a cam, so that it will move the cutting tool in to the proper point and give the proper clearance or backing off or undercutting necessary, it being quite obvious that as the adjusting screw 41 is screwed in the lever 33 is rotated in a clockwise direction, and the tool is operated to the right by reason of the dove tail slide being shifted to the right, as shown in Fig. 3, so that the amount of backing off is less than it would be in case the adjusting screw were in the position shown in Fig. 4. It is also quite obvious that the springs 26 hold the dove tail slide and the cutting tool mounted thereon away from the work. After the machine has been properly adjusted and power is applied, the rotation of the cutter blank as well as the face plate 8 causes the cutting tool to start in at the straight edge of a tooth and then to be forced in toward the center as the cutter blank rotates with the live spindle, this being brought about by reason of one of the cams engaging the shoe 38 and causing the lever 33 to be rotated in a clockwise direction, thereby moving the dove tail slide with the tool to the right, as shown in Figs. 3 and 4. As soon as the cam moves under the shoe and the high points pass the springs normally shift the dove tail slide back to normal position, or in other words move the cutting tool out to normal position to engage the straight edge of the next adjacent tooth. In this way the teeth are automatically backed off or undercut.

Having described my invention, I claim:—

1. In mechanism for backing off the teeth of cutter blanks, means for rotating the cutter blank comprising a cam member with a plurality of cams therein corresponding to the number of teeth in the cutter blank, said members rotating together, a base secured to the stationary part, a slide mounted in said base, a tool support adjustably mounted on said slide, a tool carried by said support, means normally tending to shift said tool away from the work, a lever mounted on said base, connections between said lever and said slide, a rod slidably mounted in the base, a cam shoe carried thereby for coöperation with said cams, connections between said rod and said lever, said lever when actuated by said cams being adapted to shift the tool toward the work to back off the teeth thereof.

2. In mechanism for backing off the teeth of cutter blanks, means for rotating the cutter blank comprising a cam member with a plurality of cams thereon corresponding to the number of teeth in the cutter blank, said members rotating together, a base secured to the stationary part, a slide mounted in said base, a tool support adjustably mounted on said slide, a tool carried by said support, means normally tending to shift said tool away from the work, a lever mounted on said base, connections between said lever and said slide, a rod slidably mounted in the base, a cam shoe carried thereby for coöperation with said cams, connections between said rod and said lever, said lever when actuated by said cams being adapted to shift the tool toward the work to back off the teeth thereof, and means for adjusting the movement of said lever.

In testimony whereof I affix my signature in presence of two witnesses.

BENJAMIN T. BROWAND.

Witnesses:
G. O. FARQUHARSON,
EUGENE R. SEITER.

Copies of this patent may be obtained for five cents each, by addressing the "Commissioner of Patents, Washington, D. C."